United States Patent [19]
Ito et al.

[11] Patent Number: 5,742,782
[45] Date of Patent: Apr. 21, 1998

[54] PROCESSING APPARATUS FOR EXECUTING A PLURALITY OF VLIW THREADS IN PARALLEL

[75] Inventors: Motohisa Ito, Kokubunji; Eiki Kamada, Hadano, both of Japan

[73] Assignee: Hitachi, Ltd., Tokyo, Japan

[21] Appl. No.: 422,220

[22] Filed: Apr. 14, 1995

[30] Foreign Application Priority Data

Apr. 15, 1994 [JP] Japan .................... 6-102275

[51] Int. Cl.$^6$ .................................... G06F 9/38
[52] U.S. Cl. .................................... 395/386; 395/388
[58] Field of Search ........................ 395/375, 800, 395/700, 650, 386, 388

[56] References Cited

U.S. PATENT DOCUMENTS

| | | | |
|---|---|---|---|
| 5,295,249 | 3/1994 | Blaner et al. | 395/375 |
| 5,299,321 | 3/1994 | Iizuka | 395/375 |
| 5,430,851 | 7/1995 | Hirata et al. | 395/375 |
| 5,450,556 | 9/1995 | Slavenburg et al. | 395/375 |
| 5,511,172 | 4/1996 | Kimura et al. | 395/375 |
| 5,513,363 | 4/1996 | Kumar et al. | 395/800 |
| 5,530,817 | 6/1996 | Masubuchi | 395/375 |

FOREIGN PATENT DOCUMENTS 4-360234  12/1992  Japan .

OTHER PUBLICATIONS

Dynamically scheduled VLIW processors by Rau, 1993 IEEE publication pp. 80–92, 1993.

The Gmicro/500 superscalar microprocessor with branch buffers by Uchiyama et al., 1993 IEEE publication, pp. 12–22, 1993.

"Nikkei Electronics", No. 487, pp. 190–200.

"An Elementary Processor Architecture with Parallel Instruction Issuing From Multiple Threads", Parallel Processingt Symposium JSPP, Jun. 1992, pp. 257–264.

"A Variable Instruction Stream Extension to the VLIW Architecture", A. Wolfe et al, Dept. of Electrical and Computer Engineering, Carnegie Mellon University, ASPLOS 91, pp. 2–14.

"Limits on Multiple Instruction Issue", M. Smith et al, Center for Integrated Systems, Stanford University, ASPLOS '89, pp. 290–302.

"Processing Coupling: Integrating Compile Time and Runtime Scheduling for Parallelism", S. Keckler et al, Artificial Intelligence Laboratory & Laboratory for Computer Scient, Massachusetts Institute of Technology, ASPLOS '92, pp. 202–213.

Primary Examiner—Krisna Lim
Assistant Examiner—Zarni Maung
Attorney, Agent, or Firm—Antonelli, Terry, Stout & Kraus, LLP

[57] ABSTRACT

An information processing apparatus based on a VLIW system which eliminates an idle execution part generated during execution and which uses execution parts efficiently to obtain a high parallel processing ability of instruction execution. The information processing apparatus simultaneously executes m of multiple threads of long instructions each made up of n of operational instructions. When it is desired to process 3 threads with 4 of the operational instructions as an example, the information processing apparatus includes 3 instruction decoders corresponding to the 3 threads, 4 instruction schedulers for the operational instructions, and 4 execution parts corresponding to the 4 operational instructions. The instruction decoders, which are operated independently of each other, include a circuit for resolving a resource competition relationship and a data dependent relationship and a circuit for controlling instruction issuance. Thus, even when a previous instruction is being executed, the subsequent instructions are issued to the respective instruction schedulers respectively independently when there is no resource competition relation and also no data dependent relationship. Each of the instruction schedulers performs scheduling operation over the operational instructions to be sent to the corresponding execution parts between the plurality of threads.

2 Claims, 13 Drawing Sheets

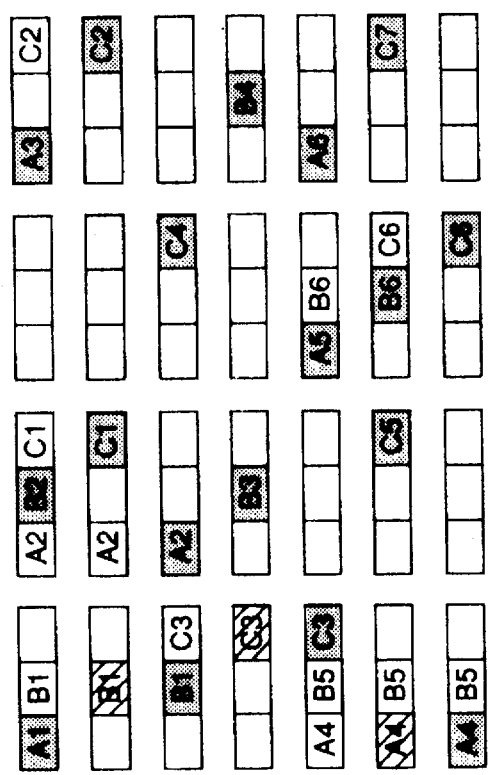
FIG.15A
FIG.15C
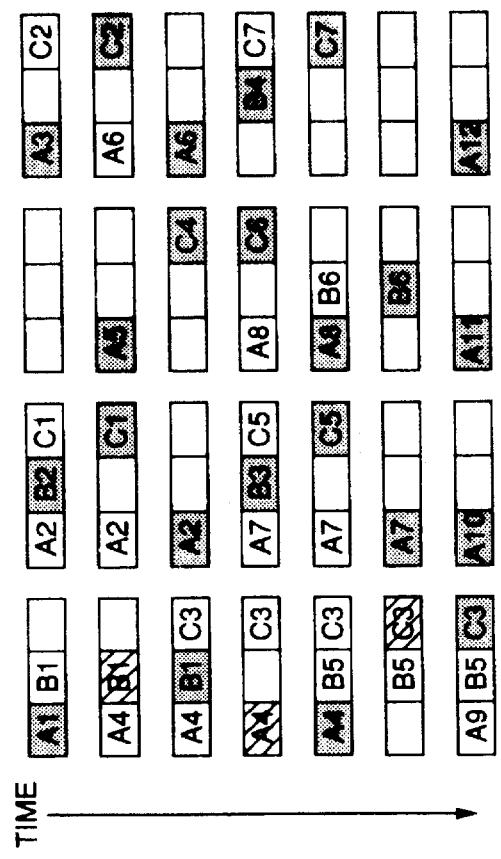
FIG.15B
TIME →

PROCESSING APPARATUS FOR EXECUTING A PLURALITY OF VLIW THREADS IN PARALLEL

BACKGROUND OF THE INVENTION

The present invention relates to an information processing apparatus which employs a very long instruction word (which will sometimes be referred to merely as VLIW, hereinafter) to improve parallel executability and performance.

FIG. 7 shows an example of a computer based on a VLIW system, which includes a main memory 71, an instruction fetch part 72, an instruction decoder 73 (including acceptable bit part 85 and an instruction buffer 81), operators 75a to 75d, and a register 76. In the VLIW system, a long instruction is divided into a multiplicity of operation fields in which resources including an execution part, a register and a memory are independently controlled to realize parallel processing.

In the VLIW system, a parallel processing ability is extracted during compilation. A compiler extracts parallel-executable operational instructions from a program and combines these instructions into a single long instruction.

In the VLIW system, check is made on dependent relationships between the operational instructions starting with a data dependent relationship during the compilation, while such dependent relationship check is not made during execution. For this reason, hardware for checking the dependent relationships becomes unnecessary and thus the number of pieces of necessary hardware can be reduced.

However, since this system has no such hardware as to check dependent relationships between instructions, there sometimes occurs a situation where the execution part becomes empty. More specifically, since the VLIW system not having such hardware as to check the dependent relationships between the instructions can execute the next long instruction only after completing a preceding long instruction for the purpose of insuring its consistency.

Accordingly, when there is present in a long instruction an operational instruction different in execution time from those of the other operational fields, the next long instruction is executed only after an operational instruction having the longest execution time is completed, which results in that there occurs an execution part whose operational instruction is not executed.

An example of such an operational instruction as to have different execution times is a data load/store instruction. Cache hit and mishit provide different execution times for the data load/store instruction.

Further, there is another cause of generating an empty execution part. In the VLIW system, when operational instructions corresponding in number to operational fields can be combined into a signal long instruction, the system can attain its highest processing performance. The number of operational instructions which can be combined into a single long instruction, depends not only on the compiler's performance but also on the property of a source program.

When the ratio between parallel-executable and parallel-unexecutable operational instructions contained in a source program is low, the number of operational instructions which can be combined into a single long instruction is also small. With respect to an ordinary program, the number of parallel-executable operational instructions is not so large. For example, a magazine "Nikkei Electronics", No. 487 states therein that only 2 or 3 operational instructions on an average can be executed on a parallel basis.

As mentioned above, the VLIW system has shortcomings which follow.

(1) When a long instruction contains an operational instruction different in execution time from those of the other operational instructions, there occurs an empty execution part because the system must wait for completion of the execution.

(2) An ordinary program is not so high in its parallel processing ability that it is rare to be able to allocate operational instructions to all the operational fields of a long instruction.

Other prior art technique related to the above is, for example, "An Elementary Processor Architecture with Parallel Instruction Issuing from Multiple Threads", Parallel Processing Symposium JSPP'92, June 1992, pp. 257–264.

SUMMARY OF THE INVENTION

It is accordingly an object of the present invention to provide (1) means for eliminating any empty execution part generated by waiting for execution completion and (2) means for enhancing an effective parallel processing ability.

In accordance with an aspect of the present invention, there is provided an information processing apparatus for processing m (m being one or more) of instruction streams of long instructions each having n (n being one or more) of operational fields classified according to operation types and arranged to cause operational instructions within one of the operational fields to be independent of operational instructions within the other operational fields, and which comprises m of instruction decoders, n of instruction schedulers provided to correspond in number to the operation types for receiving operational instructions issued from the instruction decoders, execution parts provided to correspond to the n instruction schedulers for executing operational instructions issued from the corresponding instruction schedulers, and register parts, wherein each of the instruction decoders includes an instruction buffer for storing therein the long instruction and means, on the basis of a register data dependent relationship and resource competition between the long instruction in execution and the long instruction within the instruction buffer, for controlling issuance of the long instruction within the instruction buffer to the instruction scheduler even when execution of all the operational instructions within the long instruction in execution is not completed yet.

In accordance with another aspect of the present invention, there is provided an information processing apparatus which comprises m of instruction decoders, n of instruction schedulers provided to correspond in number to the operation types for receiving operational instructions issued from the instruction decoders, execution parts provided to correspond to the n instruction schedulers for executing operational instructions issued from the corresponding instruction schedulers, and register parts, wherein each of the instruction decoders includes an instruction buffer for storing therein the long instruction, judgement means for judging a register data dependent relationship and resource competition between the long instruction in execution and the long instruction within the instruction buffer, and means for dividing the long instruction within the instruction buffer into operational instructions and for controlling issuance of the divided operational instructions to the corresponding instruction scheduler even when execution of all the operational instructions within the long instruction in execution is not completed yet, and wherein each of the instruction schedulers includes an instruction scheduler buffer for holding the operational instructions issued from the instruction decoder and means for selecting one of the operational instructions to be sent to the execution part among the operational instructions held in the instruction scheduler buffer and for controllably sending the selected operational instruction to the execution part together with the instruction stream number, and wherein each of the execution parts includes operational instruction execution means for executing the operational instructions received from the instruction scheduler, means for receiving and holding the instruction stream number received from the instruction scheduler, means for controlling operation of the operational instruction execution means on the basis of the received operational instruction and instruction stream number, and means for informing the instruction decoder and instruction scheduler of a state of aid operational instruction execution means.

In the present invention, the operational instruction execution means of the execution part, when detecting an exception generation through the execution of the operational instruction sends an exception generation signal to the instruction decoder corresponding to the instruction stream number, and the decoder includes means, when the operational instruction execution means of all the execution parts are in an acceptable state, for giving an instruction to the execution part which sends the exception generation signal to re-execute the operational instruction which caused the exception.

In accordance with the present invention, an idle execution part caused by the queuing of execution completion can be eliminated and thus the instruction execution of the execution parts can be efficiently carried out.

Further, since scheduling of instructions in the plurality of threads enables increase of an effective parallel processing ability and elimination of the idle execution parts caused by the data dependent relationship, the parallel processing ability can be made high while eliminating any idle operators.

BRIEF DESCRIPTION OF THE DRAWINGS

FIGS. 15A, 15B and 15C show examples of operation of multiple threads.

DESCRIPTION OF THE PREFERRED EMBODIMENTS

An embodiment of the present invention will be explained with reference to the accompanying drawings, in which a number enclosed by double quotes "" denotes a binary number and a number not enclosed by quotes denotes a decimal number.

Figure 8:
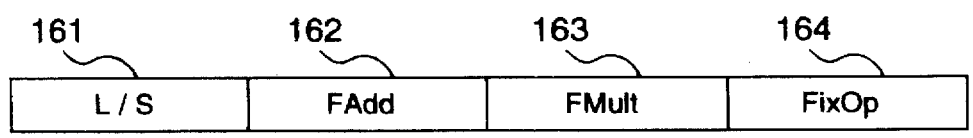
FIG. 8 is a diagram showing an example of a long instruction used in the present invention.

Referring to FIG. 8, there is shown an embodiment of a long instruction used in the present invention, which instruction has four L/S, FAdd, FMult and FixOp operational fields 161, 162, 163 and 164 in which the following operational instructions are placed respectively.

L/S operational field: Operational instruction for loading/storing data between a main memory and a register (which will be referred to merely as the L/S instruction, hereinafter).

FAdd operational field: Operational instruction for performing floating point adding/subtracting operation (which will be referred to merely as the FAdd instruction).

FMult operational field: Operational instruction for performing floating point multiplying operation (which will be referred to merely as the FMult instruction).

FixOp operational field: Operational instruction for integer operation (which will be referred to merely as the FixOp instruction).

The operational instructions of the present embodiment are limited to only ones of a load/store type in which data transaction is carried out between the main memory and register.

The number of operands given to the respective operational instructions of the operational fields is as follows.

---

FAdd, FMult and FixOp operational fields:
    Operational source: 2
    Operational destination: 1
L/S operational field:
    Address calculation source: 1
    Load data destination: 1 (for data load instruction)
    Store data source: 1 (for data store instruction)

---

Figure 9:
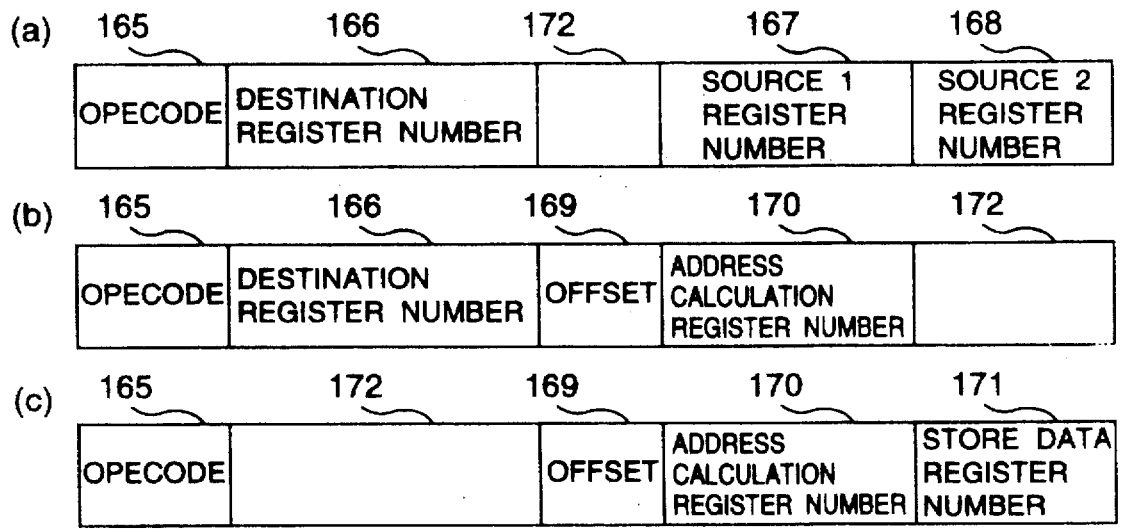
FIG. 9[(a), (b), and (c)] shows examples of an operational instruction of the long instruction used in the present invention.

Examples of an operational instruction used in the present invention are shown in FIG. 9, in which FIG. 9(a) shows a structure of the FAdd, FMult or FixOp instruction, FIG. 9(b) shows a structure of the data load instruction of the L/S instruction, and FIG. 9(c) shows a structure of the data store instruction of the L/S instruction.

(a) As shown in FIG. 9, each of the FAdd, FMult and FixOp instructions is made up of fields of an opecode, a destination (destination register number), an empty field, a source 1 (source 1 register number) and a source 2 (source 2 register number).

The execution of this instruction is to perform an operation designated by the opecode field over the values of registers designated by the sources 1 and 2 fields and to store the operation result in the destination register.

(b) The data load instruction is made up of fields of an opecode, a destination (destination register number), an offset, a base (number of a base register for performing address calculation), an empty field.

The execution of this instruction is to add the value of the offset field to the value of the base register to find an address of the main memory and to transfer data from the address to the destination register.

(c) The data store instruction is made up of fields of an opecode, an empty field, an offset, a base (number of base register for performing address calculation), and a source (store data register number).

The execution of this instruction is to add the value of the offset field to the value of the base register to find an address of the main memory and to transfer data from this address to the source register.

A long instruction used in the present embodiment is obtained by a compiler combining operational instructions having no data dependent and control dependent relationships into the single long instruction. When the compiler tries to generate a long instruction but there is no suitable operational instruction to be placed in a corresponding field thereof, a Nop instruction is placed therein in place of the suitable operational instruction. The Nop instruction is such an operational instruction that causes no operation.

Figure 1:
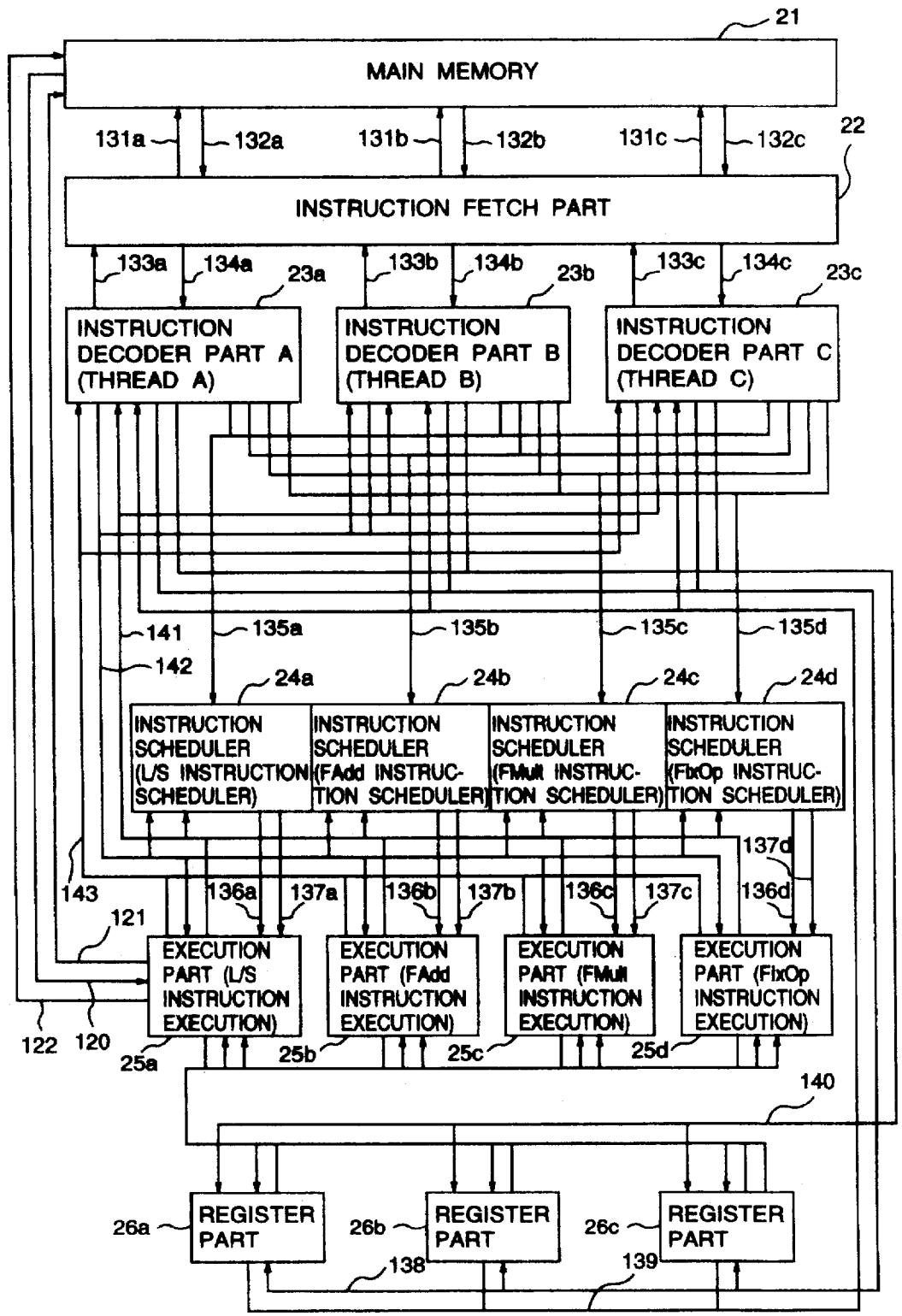
FIG. 1 shows an embodiment of the present invention.

Shown in FIG. 1 is an information processing apparatus for processing 3 independent instruction flows as an embodiment of the present invention. There is no data or control dependent relationship between the 3 instruction streams. These 3 instruction streams are hereinafter referred to as the threads A, B and C respectively. The information processing apparatus of the present invention includes a main memory 21, an instruction fetch part 22, an instruction decoder 23, an instruction scheduler 24, an execution part 25, a register part 26, and other elements (which are omitted in FIG. 1).

More in detail, the main memory 21 stores therein programs and data for the respective threads A, B and C. It is assumed that a cache memory is contained in the main memory 21. The instruction fetch part 22, with respect to each of the threads, acts to send to the main memory 21 an address 131 of the main memory for fetching a long instruction, extract a long instruction 132 from the address and send the extracted long instruction to the instruction decoder 23.

When an instruction issuance signal 133 is issued from the instruction decoder 23, the apparatus repeats the following operation for each machine cycle.

When it is desired to process 3 instruction streams or threads, for example, as shown in FIG. 1, the addresses 131 for fetching of respective instructions of the threads A, B and C are sent to the main memory 21 respectively independently to extract the associated long instructions from the main memory.

The instruction decoder 23 acts (1) to judge the possibility of issuing an operational instruction, (2) to issue the operational instruction to the instruction scheduler 24, (3) to manage the state of the register, and (4) to request the instruction fetch part 22 to fetch the next instruction.

The instruction decoder 23 repeats the above operation for each machine cycle.

When it is desired to process 3 instruction streams or threads, for example, as shown in FIG. 1, the instruction decoder 23 is made up of 3 instruction decoder parts 23a, 23b and 23c corresponding to the threads A, B and C. And the respective instruction decoder parts 23a, 23b and 23c are independently operated without interfering with each other.

The instruction scheduler 24, which is provided one for each instruction, acts to select one of the operational instructions 135 issued from the instruction decoder 23 which is to be sent to the execution part 25.

The instruction scheduler 24, if an instruction is issued from the instruction decoder 23, repeats the above operation for each machine cycle.

When an instruction is a long instruction having such an operational fields as shown in FIG. 8 for example, the instruction scheduler 24 is made up of 4 of an instruction scheduler 24a for the L/S instruction, an instruction scheduler 24b for the FAdd instruction, and instruction scheduler 24c for the FMult instruction, and an instruction scheduler 24d for the FixOp instruction, corresponding to the respective operational fields. And the instruction schedulers 24a, 24b, 24c and 24d are independently operated without interfering with each other.

The execution part 25, which is provided one for each instruction, acts (1) to execute an operational instruction received from the instruction scheduler 24, and (2) to judge whether to be able to accept the next operational instruction.

The execution part 25, which is arranged on an operational pipeline basis, can start executing the next operational instruction without need for completing the preceding operational instruction. However, the execution starting time of the execution part 25 for the next operational instruction varies depending on the type of the operational instruction or on the execution state. For this reason, the execution part 25, on the basis of the execution state of the operational instruction, judges the possibility or impossibility of accepting the next operational instruction.

The execution part 25, while receiving an operational instruction from the instruction scheduler 24, repeats the above operation for each machine cycle.

When an instruction is a long instruction having such 4 operational fields as shown in FIG. 8, for example, the execution part 25 is made up of 4 of an execution part 25a for the L/S instruction, an execution part 25b for the FAdd instruction, an execution part 25c for the FMult instruction, and an execution part 25d for the FixOp instruction, corresponding to the respective operational fields. And the respective instruction execution parts 25 are operated independently without interfering with each other.

The register part 26 acts (1) to hold data therein, (2) to hold the state of the register therein, and (3) to update the state of the register.

The register takes two states of (a) undetermined and (b) determined.

(a) The undetermined state refers to such a state that an operational instruction for rewriting the value of the register was issued from the instruction decoder 23 but the execution is not completed yet, that is, the value of the register is not determined.

(b) The determined state refers to such a state that the execution of the operational instruction is already completed and the value of the register is already determined.

When it is desired to process such 3 instruction streams as shown in FIG. 1, for example, the register part 26 is made up of 3 of registers 26a, 26b and 26c, corresponding to the respective instruction streams.

The operation of the instruction fetch part 22 will be detailed. When attention is paid to a certain instruction, the instruction fetch part 22 gives the instruction fetch address 131 to the main memory 21 to extract a long instruction from the main memory 21, and sends the long instruction to an instruction buffer 31 (FIG. 2) of the instruction decoder 23 via a signal line 134.

When a preceding long instruction is issued from the instruction decoder 23, the instruction fetch part 22 fetches the next long instruction from the main memory 21. It is designated in the instruction issuance signal 133 whether or not the long instruction was issued from the instruction decoder 23. When the instruction issuance signal 133 is at "1", a long instruction is issued from the instruction decoder 23 and the instruction fetch part 22 performs an instruction fetch from the main memory. When the instruction issuance signal 133 is at "0", on the other hand, no long instruction is issued from the instruction decoder 23 and thus no instruction fetch is carried out. The above operation is carried out independently of each instruction stream.

Figure 2:
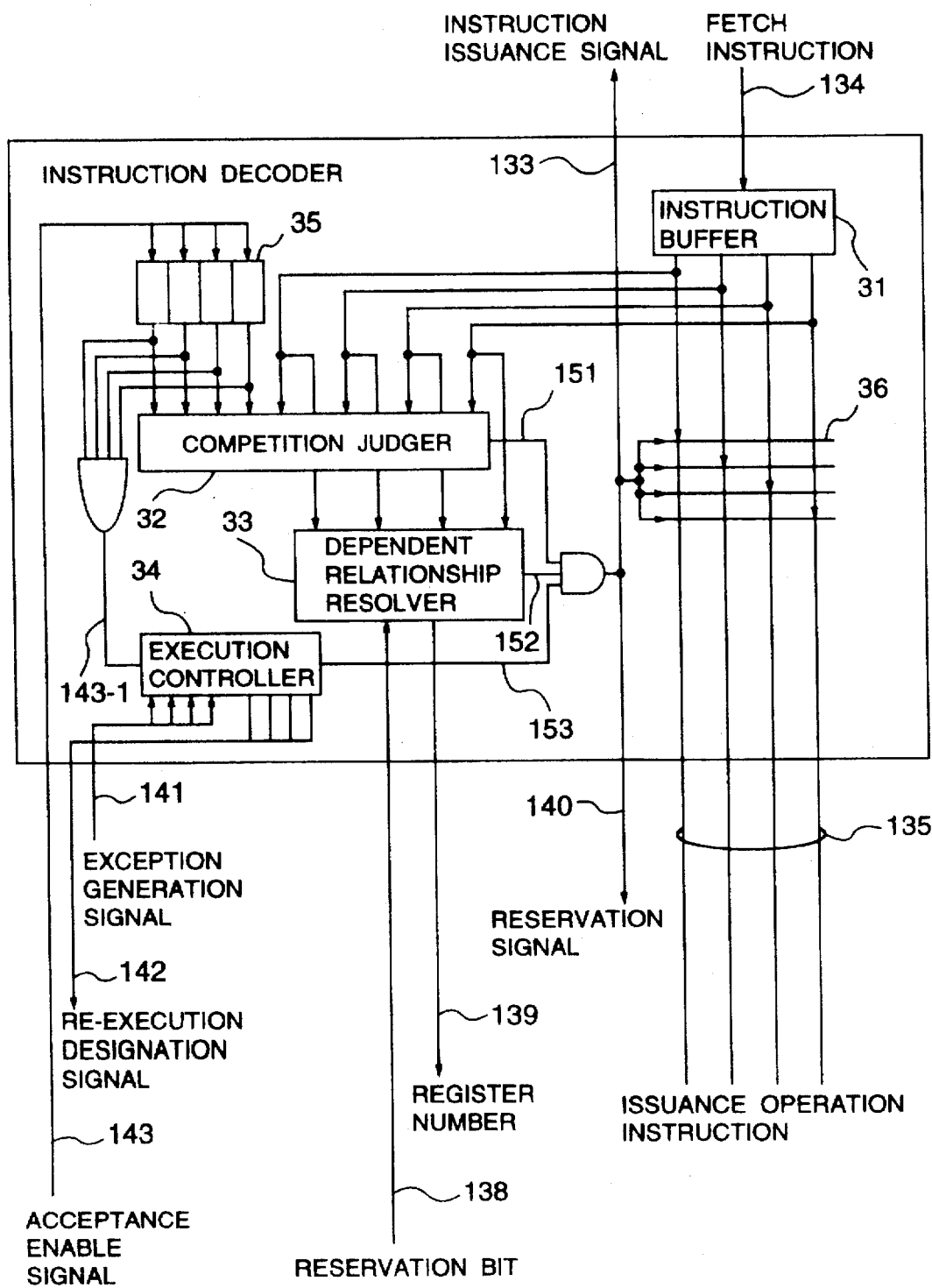
FIG. 2 shows an embodiment of an instruction decoder.

The operation of the instruction decoder 23 will next be detailed. FIG. 2 shows an embodiment of the instruction decoder 23 which includes an instruction buffer 31, a competition judger 32, a dependent relationship resolver 33, an execution controller 34, an acceptable flag 35, and an instruction issuer 36.

Explanation will then be made as to the operations of the constituent parts of the instruction decoder 23. The instruction buffer 31 holds a long instruction received from the instruction fetch part 22 before issuing the long instruction to associated one of the instruction schedulers 24.

Figure 10:
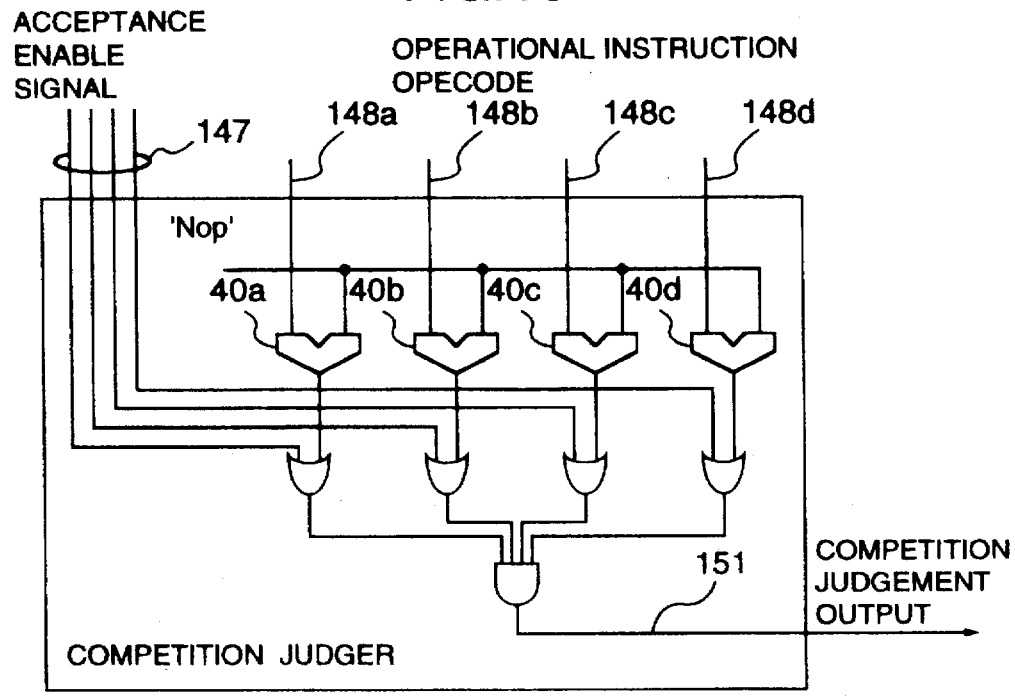
FIG. 10 shows an embodiment of a competition judger.

The competition judger 32 examines the competitive state of the execution parts 25. FIG. 10 shows an embodiment of the competition judger 32. The competitive state of the execution part 25 refers to such a state that (a) a long instruction in the instruction buffer 31 has an operational field having no Nop instruction and (b) one or more operational instructions unacceptable for the execution parts 25 corresponding to the above operational field are present in the execution parts. The acceptability of non-acceptability of operational instructions of the execution part 25 is indicated by the acceptable flag 35 in which an acceptance enable signal 143 is written.

The competition judger 32 compares the acceptable flag 35 ("1" if acceptable, otherwise "0") and the operational and Nop instructions of the instruction buffer 31, examines the competitive state of the associated execution part 25 on the basis of its comparison result ("1" if the operational instruction is the Nop instruction and otherwise, "0"), and outputs the result onto a signal line 151. The value "1" of the competition judgement output on the signal line 151 means that any of the 4 execution parts are not in the competitive state, whereas, the value "0" of the competition judgement output means that at least one of the 4 execution parts is in the competitive state.

Figure 11:
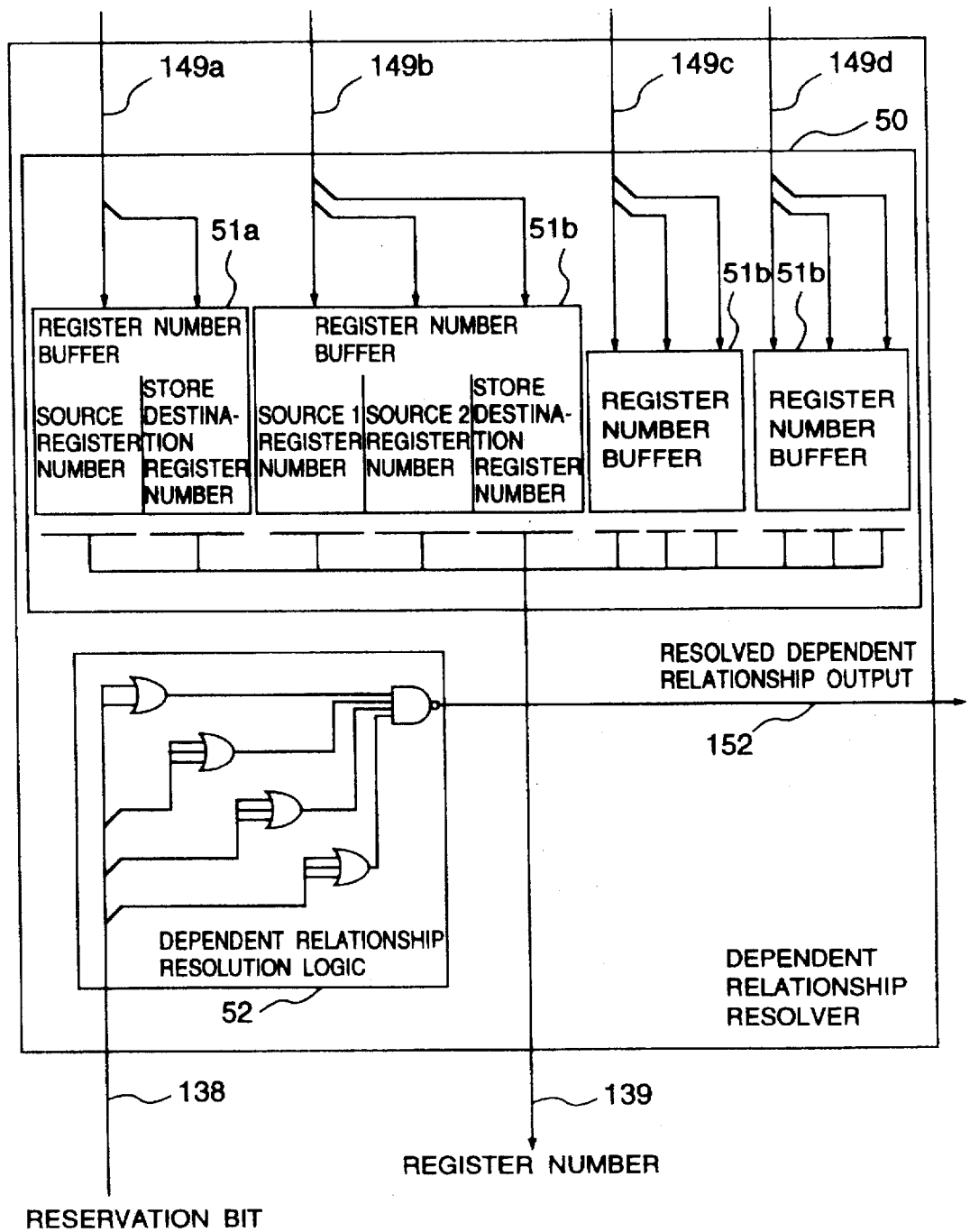
FIG. 11 shows an embodiment of a dependent relationship resolver.

The dependent relationship resolver 33 examines the data dependent relationships of the register between the operational instruction in execution and the long instruction of the instruction buffer 31. An embodiment of the dependent relationship resolver 33 is shown in FIG. 11. The data dependent relationships include (a) RAW (Read After Write) dependent relationship, (b) WAR (Write After Read) dependent relationship and (c) WAW (Write After Write) dependent relationship. Explanation will first be made as the above 3 sorts of data dependent relationships. Reference symbols R1 to R5 denote registers respectively. A relationship of R1←R2+R3 means that the values of the registers R2 and R3 are added together and its addition result is substituted into the register R1.

(a) RAW Dependent Relationship

1: R1←R2+R3

2: R4←R1+R5

When the instruction execution is carried out in an order of 1 and 2, the execution of the instruction for 1 cannot start before the value of the register R1 is determined.

(b) WAR Dependent Relationship

1: R2←R1+R3

2: R1←R4+R5

When the instruction execution is carried out in an order of 1 and 2, the result of execution of the instruction for 2 can be written in the register R1 only after the execution of the instruction for 1 is started.

(c) WAW Dependent Relationship

1: R1←R2+R3

2: R1←R4+R5

When the instruction execution is carried out in an order of 1 and 2, the result of execution of the instruction for 2 cannot be written in the register R1 only after the execution of the instruction for 1 is started.

As mentioned above, the WAR dependent relationship does not take place among the 3 dependent relationships. This is because the instruction decoder 23 issues the next long instruction only after the execution of all of the operational instructions within the preceding long instruction is started, that is, only after the reading of the value of the source register is completed.

Thus, the data dependent relationships to be solved by the dependent relationship resolver 33 are (a) RAW dependent relationship and (c) WAW dependent relationship. These two types of dependent relationships take place (a) when the reading of the value from the register is carried out and (c) when the writing of the value into the register is carried out. In other words, when the register in the undetermined state is to be used, (a) RAW dependent relationship and (c) WAW dependent relationship occur. Accordingly, when finding the undetermined state of the register, the dependent relationship resolver 33 can solve the data dependent relationship.

The state of the register is specified by a reservation bit 174 (see FIG. 6) possessed by the register part 26. The reservation bit 174 of the register in the undetermined state has a value "1". The dependent relationship resolver 33 examines the reservation bits 174 of the registers for operands of the operational instructions held in the instruction buffer 31, and outputs its examined and resolved dependent relationship onto a line 152. The value "1" of the resolved dependent relationship output 152 means that all the reservation bits have a value "0" with the result that there is no data dependent relationship; whereas, the value "0" of the resolved dependent relationship output 152 means that any of the reservation bits having a value "1" is present with the result that there is a data dependent relationship.

The execution controller 34 monitoring the executing states of the respective execution parts 25, when an exception is caused by an operational instruction in its own instruction stream, performs its exception handling operation. When an exception is generated by an operational instruction in the other instruction streams, the execution controller 34 performs nothing.

Figure 12:
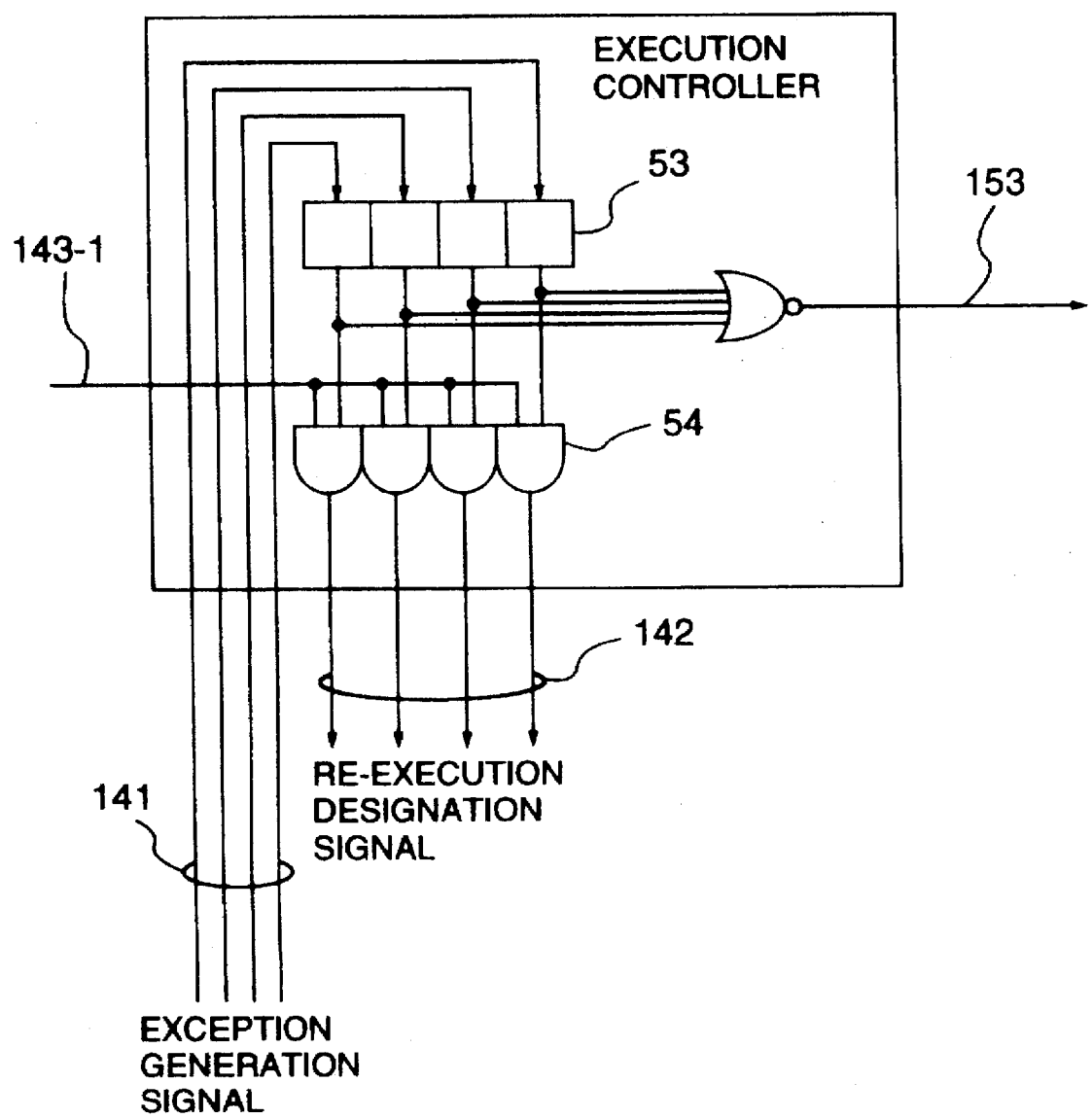
FIG. 12 shows an embodiment of an execution controller.

Shown in FIG. 12 is an embodiment of the execution controller 34. The execution controller 34 includes an exception generating flag 53 and a logic 54 for generating a re-execution designation signal.

When an exception is generated in each execution part 25 (as when division is made by 0, when an overflow occurred, etc.), the execution part 25 informs the execution controller 34 within the instruction decoder 23 corresponding the associated instruction stream that an exception was generated via an exception generation signal 141.

The execution controller 34, when receiving the exception generation signal 141, writes the signal in the exception generating flag 53. When such 4 execution parts as shown in FIG. 1 are provided as an example, the exception generating flag 53 is made up of 4 bits each corresponding to each of the execution parts 25.

The exception handling is started after the execution of all the operational instructions within a long instruction including the operational instruction causing the operational exception is fully completed. Whether or not the execution of all the operational instructions was completed is detected on the basis of the value of a signal line 143-1 corresponding to a logical "AND" operation on all the bits of the acceptable flag 35.

The re-execution designation signal generating logic 54 generates a signal 142 for instructing the execution part 25 to re-execute the operational instruction. The re-execution designation signal generating logic 54 generates the re-execution designation signal 142 by performing a logical "AND" operation on the value of the exception generating flag 53 and the value of the signal line 143-1. At the time of the re-execution start, the re-execution designation signal 142 for the corresponding operational field has a value "1".

Whether the execution controller 34 in the exception-handling start wait mode, in the exception-handling execution mode or in the normal mode is outputted onto an execution-state output line 153. The execution-state output line 153 has a value "1" when the re-execution designation signal generating logic 54 is in the normal mode and has a value "0" when the apparatus is in the exception-handling start wait mode or in the exception-handling execution mode.

Then the value of the execution-state output line 153 is generated when a logical "NOR" operation is performed on all the bits of the exception generating flag 53. While the execution controller 34 is waiting for the start of the exception handling or is handling the exception, the execution-state output signal line 153 has a value "0", which means that the execution controller 34 is in the exception-handling start wait mode or in the exception-handling execution mode. As a result, even when the issuance conditions are satisfied, the long instruction within the instruction buffer 31 is not issued therefrom.

The acceptable flag 35 is a flag indicative of whether or not the execution part 25 can accept the operational instruction. When the apparatus has such 4 execution parts as shown in FIG. 1 for example, the acceptable flag 35 is made up of 4 bits each corresponding to each of the execution parts. The bits of the acceptable flag 35 has a value "1" when the execution part 25 can accept the operational instruction, while has a value "0" when the execution part 25 cannot accept the operational instruction. The acceptable flag 35 is rewritten by the respective execution parts 25 according to the execution state of the operational instruction.

The instruction issuance signal 133, which is a signal indicative of the fact that a long instruction is issued from the instruction buffer 31, has a value "1" when the long instruction is issued from the instruction buffer 31. The condition that the instruction buffer 31 issues the long instruction, i.e., the instruction issuance signal 133 has a value "1", is satisfied (a) when there is no competitive relationship (when the signal line 151 has a value "1") and (b) when there is no data dependent relationship (when the resolved dependent relationship output 152 has a value "1") and (c) when the apparatus is in the normal state (when the execution-state output signal line 153 has a value "1").

When the instruction issuance signal 133 has a value "1", the instruction issuer 36 is opened to divide the long instruction within the instruction buffer 31 into operational instructions and then to issue them to the instruction schedulers 24. The value of the instruction issuance signal 133 is also sent to the instruction fetch part 22 to indicate fetch of the next long instruction.

The instruction issuer 36, on the basis of the value of the instruction issuance signal 133, issues the long instruction within the instruction buffer 31 to the instruction scheduler 24. In other words, the instruction issuer 36, when the instruction issuance signal 133 has a value "1", issues the long instruction of the instruction buffer 31 to the instruction scheduler 24.

A signal on a signal line 140 instructs the register part 26 to set the reservation bit of the destination register for the issued operational instruction at "1". The signal of the signal line 140 has a value "1" in the operational instruction issuance mode. The signal of the signal line 140 is generated under the same conditions as the instruction issuance signal 133.

Figure 3:
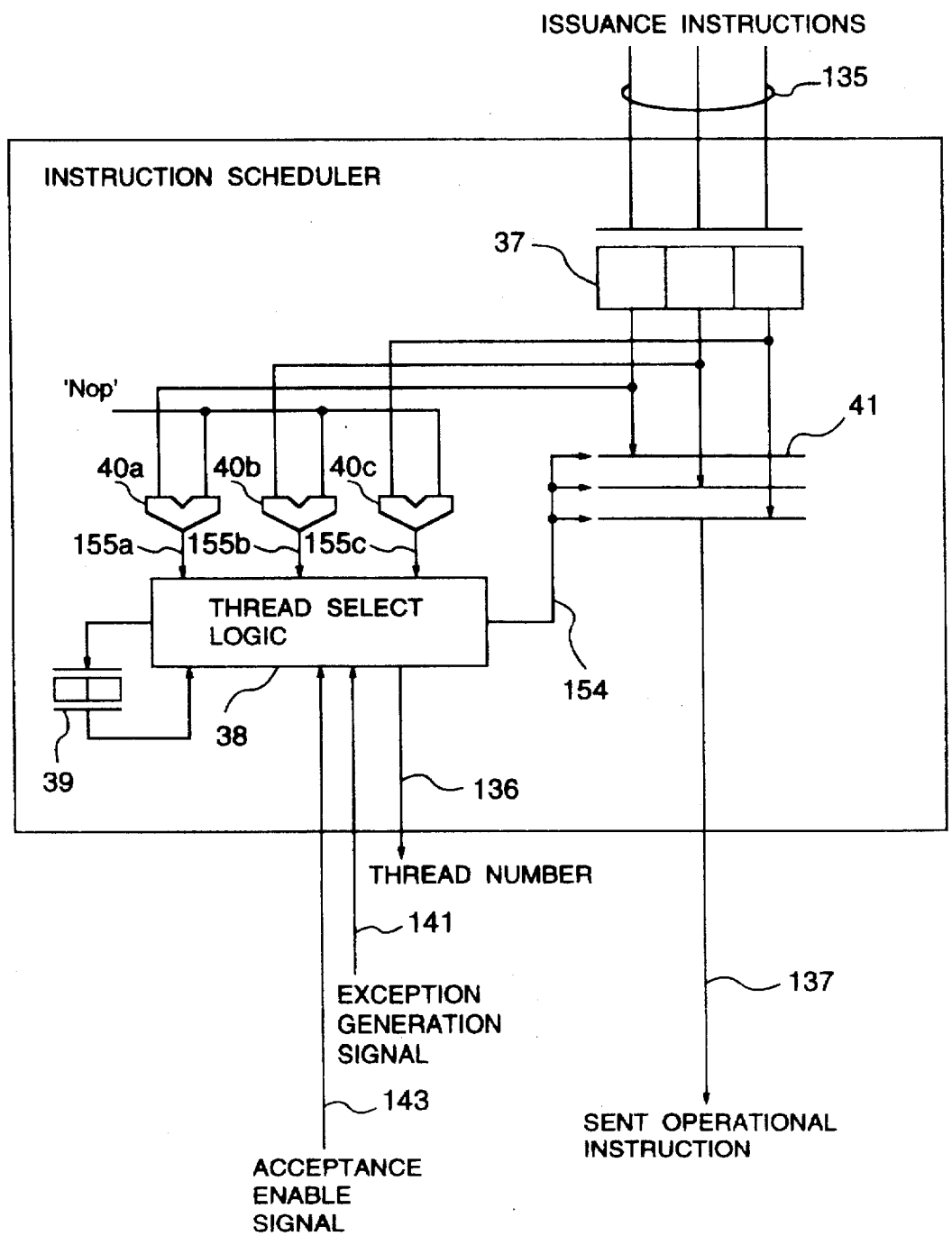
FIG. 3 shows an embodiment of an instruction scheduler.

Detailed explanation will then be made as to the operation of the instruction scheduler 24. An embodiment of the instruction scheduler is shown in FIG. 3. The instruction scheduler 24 includes a schedule buffer 37, an Opcode comparator 40, a thread select logic 38, a 2-bit counter (as an example, in the case of such 3 instruction streams as shown in FIG. 1) 39, and a send operational instruction selector 41.

More specifically, the schedule buffer 37 holds therein an operational instruction issued from the each instruction decoder 23 until the schedule buffer 37 sends it to the execution part 25. The schedule buffer 37, in the case of such 3 instruction streams as shown in FIG. 1 for example, is made up of 3 entries. If the instruction scheduler is the instruction scheduler 24a for the L/S instruction, then L/S or Nop instructions in the instruction streams are stored in the respective entries of the schedule buffer 37.

The Opcode comparator 40 judges whether or not the operational instruction within the schedule buffer is the Nop instruction and outputs a signal onto a signal line 155. The signal of the signal line 155 has a value "1" for the Nop instruction and otherwise, has a value "0". When it is desired to process such 3 instruction streams as shown in FIG. 1 as an example, the Opcode comparator 40 is provided to be made up of 3 Opcode comparator parts for each instruction stream.

Figure 13:
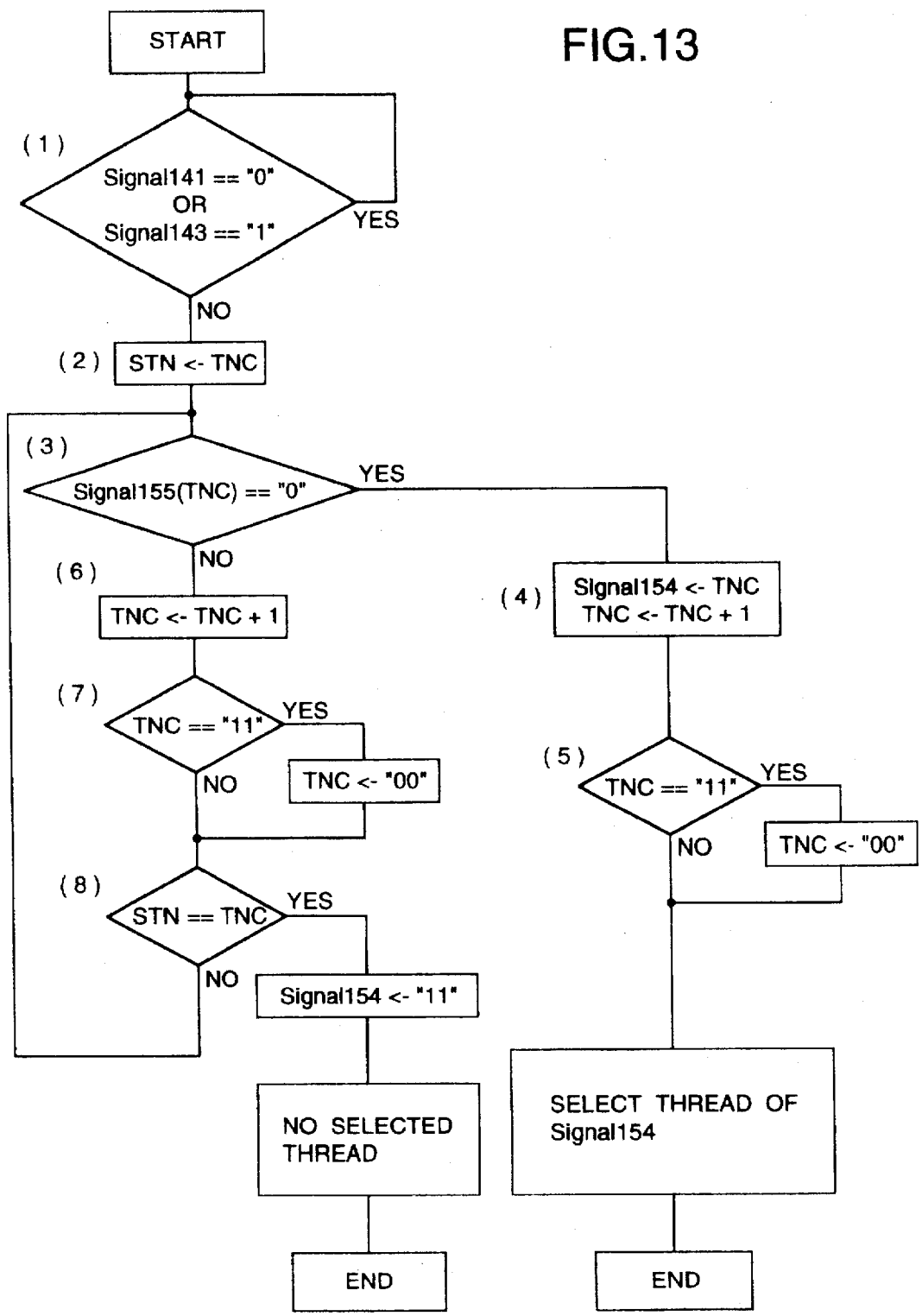
FIG. 13 is a flowchart showing the procedure of a thread select logic generating a thread select signal.

The thread select logic 38 selects one of the operational instructions to be sent. An embodiment of the thread select logic is shown in FIG. 13. The thread select logic 38 selects one of the operational instructions to be sent on the basis of the value of the 2-bit counter 39 and generates a thread select signal 154 for control of the send operational instruction selector 41 from the value of the 2-bit counter 39. When it is desired to process such 3 instruction streams as shown in FIG. 1 as an example, it is assumed that identification numbers of instructions within the respective instruction streams are defined as follows.

Numeral "00" is used for instructions of the instruction stream A; "01" is for instructions of the instruction stream B; "10" is for instructions of the instruction stream C; and "11" indicates the absence of any instruction stream.

The procedure of generating the thread select signal 154 is shown in FIG. 13. In the drawing, symbols have meanings which follow.

TNC: The value of the 2-bit counter 39.

STN: Working register for holding the value of the instruction stream number counter 39 in the start mode.

Signal141: The value of the exception generation signal 141.

Signal143: The value of the acceptance enable signal 143.

Signal154: The value of the thread select signal 154.

Signal155(n): The value of the signal line 155 for the instruction stream of instruction stream number n.

A←B: Indicates the operation of transferring contents of B to A.

A==B: Judges whether or not the value of A is equal to the value B.

OR: Operator indicative of logical "OR".

Explanation will be made as to the procedure of generating the thread select signal 154 by referring to FIG. 13. Following numbers (1)–(8) correspond to those indicated in FIG. 13.

(1): If Signal143="0" (the execution part cannot accept a new operational instruction) or Signal141="0" (during exception generation), then the thread select logic does not start the generation of the thread select signal and waits until it can start it.

(2): The thread select logic transfers TNC to STN. STN is used to terminate the generation of the thread select signal 154.

(3): If Signal155(TNC)="0", then the opcode of the instruction stream number specified by TNC does not refer to the Nop instruction. Accordingly, the thread select logic selects the instruction stream indicated by TNC.

(4): The thread select logic sets the value (Signal154) of the thread select signal 154 at the value of TNC to update the value of TNC.

(5): If TNC="11" as a result of updating TNC, then the thread select logic sets TNC at "00" and ends. Otherwise, the thread select logic ends as it is.

(6): If Signal155(TNC)="0" in (3), then the opcode of the instruction stream number designated by TNC refers to the Nop instruction. The thread select logic updates TNC and again examines the opcode.

(7): If TNC="11" as a result of updating TNC, the thread select logic sets TNC at "00".

(8): If STN=TNC, then this means that TNC made one turn of its value. At this time, the thread select logic sets TNC at "11" (absence of selected instruction stream), sets the value of the thread select signal 154 at "11" (absence of selected instruction stream), and ends.

The send operational instruction selector 41 selects, on the basis of the thread select signal 154 received from the thread select logic 38, selects one of the operational instructions to be sent to the execution part 25. The send operational instruction selector 41 is opened so that the operational instruction of the instruction stream number designated by the thread select signal 154 is sent to the execution part 25.

Figure 4:
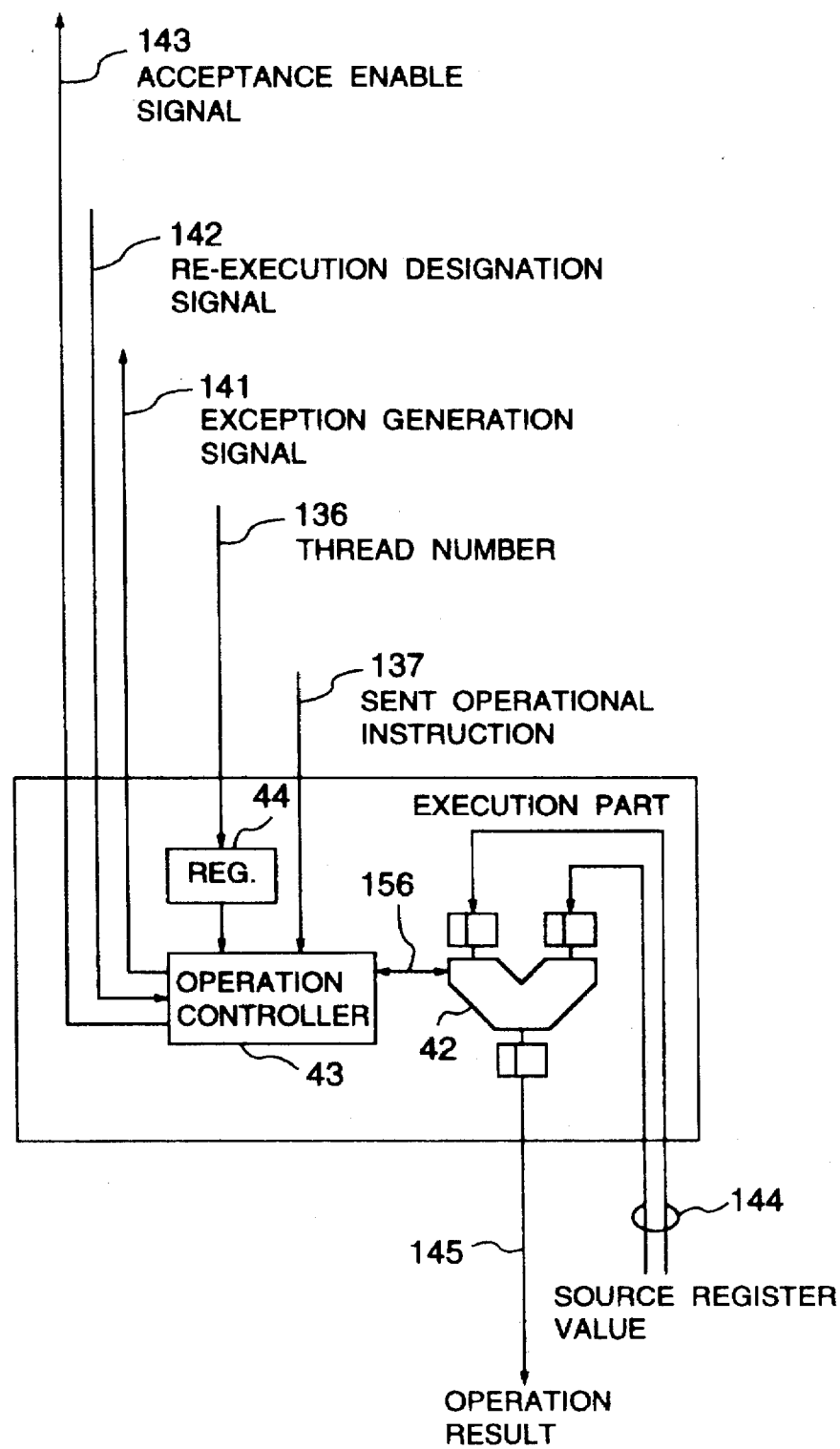
FIG. 4 shows an embodiment of an execution part.
Figure 5:
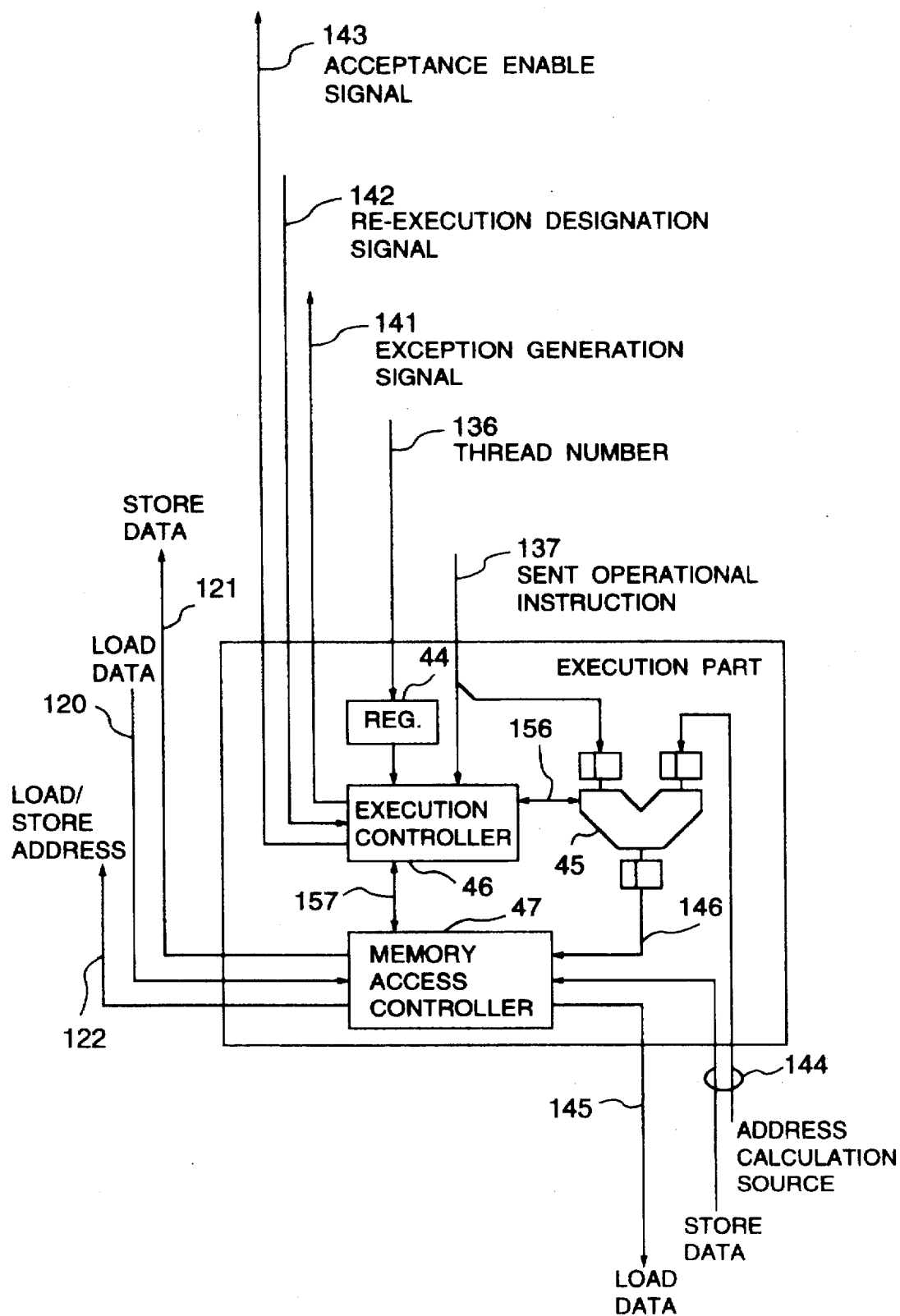
FIG. 5 shows another embodiment of the execution part.

FIGS. 4 and 5 show embodiments of the execution part 25. More in detail, FIG. 4 is an embodiment of the execution part 25 for executing operational instructions not associated with memory access, and FIG. 5 is an embodiment of the execution part 25 for executing operational instructions associated with memory access.

Explanation will be started with the execution part 25 for executing operational instructions not associated with memory access. The execution part 25 of FIG. 4 includes an operator 42, an instruction stream number register 44 and an operation controller 43. More specifically, the operator 42, according to an operational instruction 137 sent to the execution part 25, performs data transfer with the register part 26 and performs operation. In the case of the embodiment of such an execution part 25 as shown in FIG. 4 for example, the operator 42 is arranged on a 2-stage operational pipeline basis. The operator 42 sends an execution state through a signal line 156 to the operation controller 43 for each operational stage. The operator 42 also sends control of the execution state through the signal line 156 to the operation controller 43. The instruction stream number register 44 holds therein an instruction stream number of the operational instruction in execution. The instruction stream number held in the instruction stream number register 44 is used (a) to access the register part 26 associated with the operation execution, and (b) to inform the instruction decoder 23 of an exception generation. The operation controller 43 performs (a) control over the operator 42, (b) detection of an exception generation and notification thereof, and (c) control over the exception handling.

(a) The operation controller 43, in order to execute the operational instruction 137 received from the instruction scheduler 24, controls the operator 42 with use of a signal received from the signal line 156. The operation controller 43 can know the state of the operator 42 at each stage of execution of the operational instruction through the signal line 156. When the execution of the operational instruction 137 proceeds and it comes to such a state that a new operational instruction can be accepted, the operation controller 43 sets the acceptance enable signal 143 to have a value "1" and informs the instruction scheduler 24 and instruction decoder 23 of the effect. The acceptance enable signal 143 sent to the instruction decoder 23 causes the value of the acceptable flag 35 within the instruction decoder 23 to be rewritten.

(b) If the operation controller 43 detects an exception during execution of the operational instruction, the operation controller 43 sets the exception generation signal 141 to have a value "1" and informs the instruction decoder 23 of the exception generation. The instruction decoder 23 informed by the operation controller 43 of the exception is specified by the instruction stream number held in the instruction stream number register 44.

(c) When receiving the re-execution designation signal 142 from the execution part 25, the operation controller 43 re-executes the operational instruction which generated the exception. After completing the re-execution, the operation controller 43 sets the acceptance enable signal 143 to have a value "1" and informs the instruction scheduler 24 and instruction decoder 23 of the completion of the re-execution.

Explanation will next be made as to the execution part shown in FIG. 5. The execution part of FIG. 5 is different from the embodiment of the execution part of FIG. 4 in that a memory access controller 47 is provided for memory access. And an address operator 45 performs address operation unlike the operator 42 in FIG. 4. That is, the address operator 45 is used for calculating a memory access address 146. More in detail, the address operator 45 calculates the memory access address 146 on the basis of the value of an address calculation offset 169 (FIG. 9) of the operational instruction 137 and with use of an address calculation source 144. The address operator 45 inputs its output (memory access address 146) to the memory access controller 47.

An execution controller 46 issues an instruction to the address operator 45 via a signal line 157 to calculate the memory address and at the same time, informs the memory access controller 47 of the type of the memory access through the signal line 157. The memory access controller 47 in turn informs the execution controller 46 of the state of the memory access via the signal line 157. The state of the memory access informed to the execution controller 46 is, for example, hit/mishit of the cache memory.

(a) Explanation will be made as to the operation of the memory access controller 47 when the operational instruction 137 is a data load instruction.

1) The memory access controller 47 outputs the memory access address 146 to the main memory 21 through a signal line 121.

2) The memory access controller 47 waits for transfer of the data.

3) If a trouble occurs, the memory access controller 47 informs the execution controller 46 via the signal line 157. An example of such a trouble is mishit of the cache memory.

4) When receiving the data through a signal line 120, the memory access controller 47 writes the received data in the register part 26 through a signal line 145.

5) At the stage of writing the data in the register part 26, the memory access controller 47 sets the acceptance enable signal 143 to have a value "1".

(b) Explanation will be made as to the operation of the memory access controller 47 when the operational instruction 137 is a data store instruction.

1) The memory access controller 47 outputs the memory access address 146 to the main memory 21 via the signal line 121.
2) Subsequently, the memory access controller 47 outputs the store data 144 to the main memory 21 via the signal line 121.
3) If a trouble occurs, then the memory access controller 47 informs the execution controller 46 of the trouble occurrence via the signal line 157. An example of such a trouble is mishit of the cache memory.
4) At the stage of writing the data in the main memory 21, the memory access controller 47 sets the acceptance enable signal 143 to have a value "1".

Figure 6:
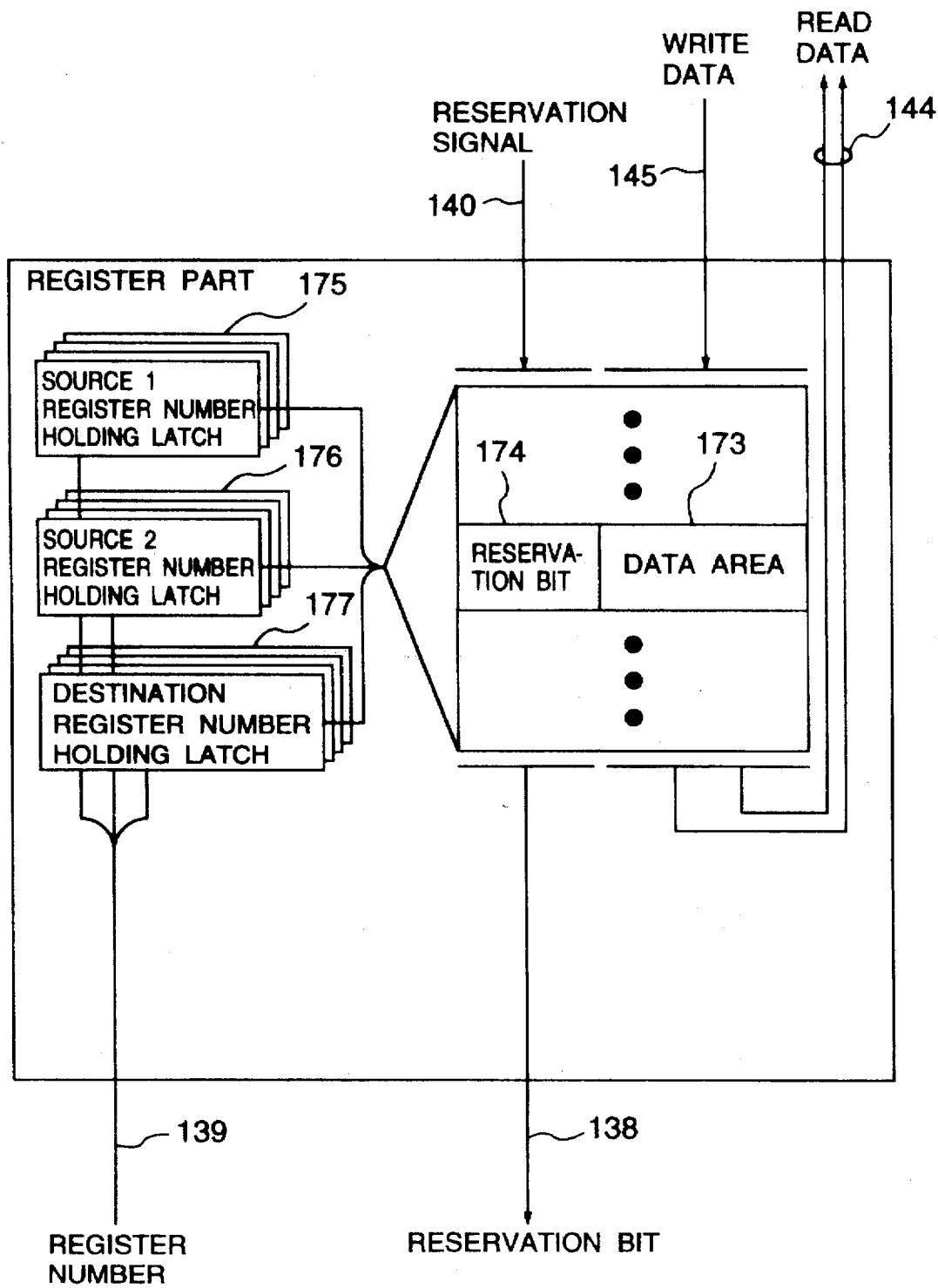
FIG. 6 shows an embodiment of a register.
Figure 7:
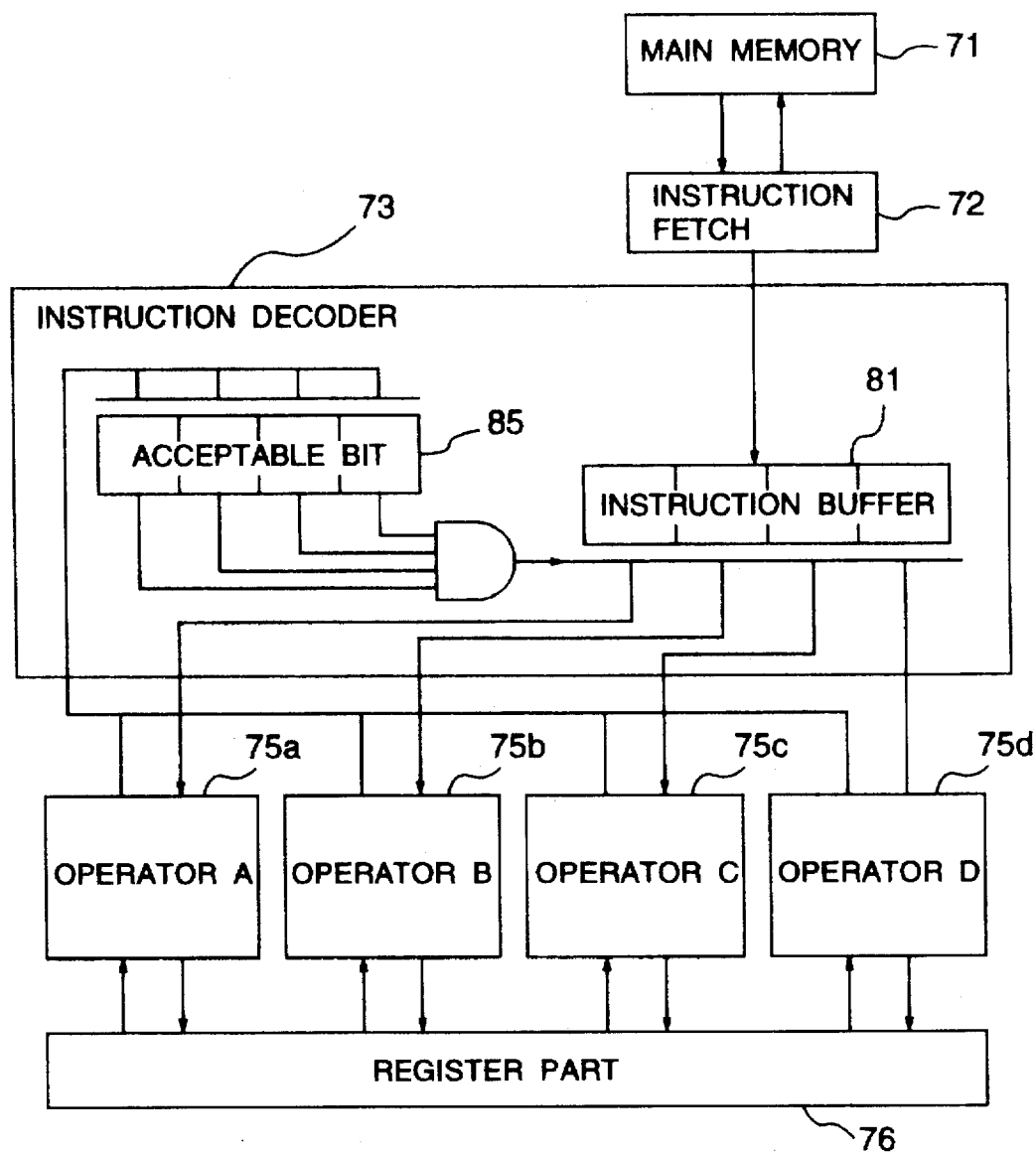
FIG. 7 shows a prior art information processing apparatus based on a VLIW system.

The register part 26 will be further detailed. An embodiment of the register part 26 is shown in FIG. 6. Each of register parts of the register is made up of (1) a data area 173, (2) a reservation bit area 174, (3) a source 1 register number holding latch 175, (4) a source register number holding latch 176, and (5) a destination register number holding latch 177. More specifically, the data area 173 is used to store therein the value of the corresponding register. The reservation bit area 174 indicative of the state of the register is made up of a single bit. The reservation bit 174 has a value "1" when not determined and a value "0" when determined. The value of the reservation bit 174 is read out from the dependent relationship resolver 33 within the instruction decoder 23 for resolving the data dependent relationship.

The source 1 register number holding latch 175 holds the register number of a source 1 register number field 167 or an address calculation register number field 170 among register numbers designated by a register number 139.

When the source 1 register number field 167 or the address calculation register number field 170 has no operational instruction, an invalid number is held in the source 1 register number holding latch 175. The word 'invalid number' refers to a meaningless number as the register number.

The source 2 register number holding latch 176 holds the register number of a source 2 register number field 168 or a store register number field 171 among the register numbers designated by the register number 139. When the source 1 register number field 167 or the address calculation register number field 170 has no operational instruction, an invalid number is held in the source 2 register number holding latch 176.

The destination register number holding latch 177 holds the register number of an destination register number field 166 among the register numbers designated by the register number 139. When the destination register number field 166 has no operational instruction, an invalid number is held in the destination register number holding latch 177.

One of the registers of the register part 26 is specified by the register number held in the source 1 register number holding latch 175, source 2 register number holding latch 176 or destination register number holding latch 177.

When an operational instruction is issued, the signal line 140 becomes valid. When the signal line 140 becomes valid, the register part 26 sets at "1" the value of the reservation bit 174 of the register held in the destination register number holding latch 177 to put the register in its undetermined state.

As the execution of the operational instruction is completed, its operation result is written through the signal line 145, which results in that the register part 26 sets at "0" the value of the reservation bit held in the destination register number holding latch 177 to put the register in the determined state.

When it is desired to process a long instruction having such 4 operational fields as shown in FIG. 8 as an example, each of the source 1 register number holding latch 175, source 2 register number holding latch 176 and destination register number holding latch 177 is provided to be made up of 4.

Explanation will then be made as to how to process the long instruction in connection with the case where it is desired to process such 3 instruction streams A, B and C as shown in FIG. 1 as an example.

In the following explanation, numbers given at the left end each denote a machine cycle number measured from the time point when the instruction decoder part A 23a a sends an instruction issuance signal 133a to the instruction fetch part 22.

00 The instruction decoder part A 23a sends the instruction issuance signal 133a to the instruction fetch part 22.

01 The instruction fetch part 22 receiving the instruction issuance signal 133a sends an instruction fetch address 131a to the main memory 21 and waits for a long instruction being fetched.

02 In the case of a cache hit, the long instruction is fetched by the instruction fetch part 22 at this time.

In the case of a cache mishit, the instruction fetch part 22 waits for a long instruction being fetched.

Since the following operation is the same regardless of the hit and mishit of the cache, explanation will be continued on the assumption that a cache hit was made.

03 The long instruction taken by the instruction fetch part 22 is transmitted to the instruction buffer 31 within the instruction decoder part A 23a.

04 The long instruction within the instruction buffer 31 is sent to the competition judger 32 and the dependent relationship resolver 33 to make competitive judgement of the execution part 25 and to examine a register dependent relationship.

At the same time when the long instruction is sent to the dependent relationship resolver 33, the dependent relationship resolver 33 extracts register numbers from the long instruction and sends them to the register part 26a. The register part 26a stores the register numbers in the associated source 1 register number holding latch 175, source 2 register number holding latch 176 or destination register number holding latch 177.

Further, the value of the reservation bit 174 of the previous register sent to the register part 26a via the register number 139 is sent to the instruction decoder part A 23a via a signal line 138.

At this time, if (a) there is no competitive relationship (the signal line 151 has a competition judgement output signal of "1") and (b) there is no data dependent relationship (the resolved dependent relationship output 152 has a value "1") and (c) the normal state (the execution-state output signal line 153 has a value of "1"), the instruction issuance signal 133 has a value "1".

05 If the instruction issuance signal 133 has a value "1", then the instruction issuer 36 is opened so that the long instruction within the instruction buffer 31 is divided into operational instructions which are then issued to the schedule buffer 37 within the instruction scheduler 24.

At the same time, the instruction issuance signal 133a is sent to the instruction fetch part 22 to fetch the next long instruction of the instruction stream A in the next machine cycle.

Further, the reservation signal on the signal line 140 is sent to the register part 26a to put the reservation bit 174 of the register stored in the destination register number holding latch in the undetermined state.

06 The operations of the instruction schedulers 24a to 24d are all the same, so explanation will be made as to the operation of only the instruction scheduler 24b.

The instruction scheduler 24b selects one of the operational instructions within the schedule buffer 37 on the basis of the thread select signal 154 generated through the procedure of FIG. 13.

The values of variables in FIG. 13 are assumed to be as follows.

The value of the 2-bit counter 39 (TNC) has a value "10". The value of the exception generation signal 141 (Signal141) has a value "0". The value of the acceptance enable signal 143 (Signal143) has a value "1". The value of Signal155 "10" has a value "1". The value of Signal155 "00" has a value "1".

Numbers enclosed by parentheses correspond to those in FIG. 13.

(1) Since Signal (141)="0" and Signal(143)="1",
(2) the value of TNC is transmitted to STN.
(3) Since Signal155 ("10")="1",
(6) TNC is set to be TNC+1.
(7) Since TNC="11", the value of TNC is "00".
(8) Since the value of STN ("10") is different from the value of TNC ("00"),
(3) Signal155 ("00") is estimated. Since Signal155 ("00") ="00",
(4) TNC ("00") is transmitted to Signal154. The value of TNC is updated to "01".
(5) Since TNC="11", the value TNC remains as it is. Since the value of the thread select signal 154 is "00", the instruction stream A is selected.

07 The send operational instruction selector 41 is opened so that the operational instructions of the instruction stream A are sent to the address operator 45 within the instruction execution part 25b. At the same time, the instruction stream number "00" is also sent to the instruction stream number register 44 within the instruction execution part 25b.

08 The register part 26a is selected on the basis of the instruction stream number "00" stored in the instruction stream number register 44 and data necessary for the operation are transmitted to the instruction execution part 25b.

09 The operation is started.

Since the operator 42 is arranged on an operational pipeline system, a new instruction can be accepted so that the acceptance enable signal 143 has a value "1".

10 During the execution of the operation. A new instruction is sent from the instruction scheduler 24b.

11 The operation is completed. The operation result is returned to the register part 26.

At the same time when the register part 26a writes the operation result in a data area of the register stored in the destination register number holding latch, the register part 26a puts the reservation bit in the determined state.

When it is desired to process such 3 instruction streams as shown in FIG. 1 as an example, the long instruction is executed in the following manner.

Figure 14:
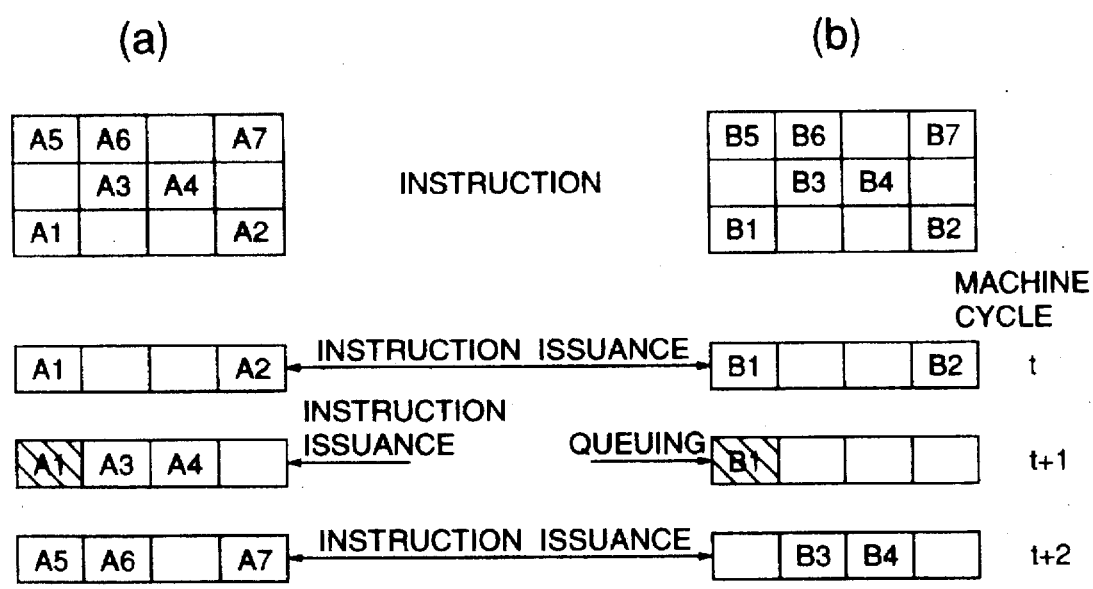
FIG. 14[(a), (b)] shows examples of operation of a single thread.

Lastly, explanation will be made as to examples of the operation of the apparatus. Operational examples in the case of a single thread are shown in FIGS. 14(a) and 14(b). In the drawings, the left side (FIG. 14(a)) corresponds to the present invention, while the right side (FIG. 14(b)) corresponds to a prior art. And the lower part shows states of the present invention and prior art in machine start cycles. Reference symbols A1 to A7 and B1 to B7 denote operational instructions. Hatched areas represent that the corresponding operation is not completed yet. At a time t+1, it is possible to issue an instruction in the present invention, while it is impossible to issue the next instruction because the completion of B1 must be awaited in the prior art.

Operational examples in the case of multiple threads are shown in FIGS. 15A, 15B and 15C. More specifically, FIG. 15A shows instruction buffers within a scheduler (instruction schedulers) corresponding to a thread number of 3 and an operator number of 4. Check of the register dependent relationship is carried out by the instruction decoder for each thread. FIGS. 15B and 15C show operational examples of the present invention and prior art respectively. In the drawings, hatched areas represent that the execution of the corresponding instruction is not completed yet, shaded areas represent that the execution of the corresponding instruction is already completed, and other areas represent that the corresponding instruction is queuing. As will be seen from the drawings, in the prior art, no instruction is issued from the decoder and thus there is no instruction to be executed, which results in that the operator is in its idle state, which state frequently occurs; whereas, in the present invention, the number of operators in the idle state is much less than that of the prior art.

In accordance with the present invention, since there can be avoided resource competition starting with data dependent relationship and operator competition which cause reduction of parallel processing ability of instruction execution, an idle time caused by the execution part not executing its operational instruction can be reduce and thus the execution part can be used with a high efficiency.

What is claimed is:

1. An information processing apparatus for processing m (m being one or more) of instruction streams of long instructions each having n (n being one or more) of operational fields classified according to operation types and arranged to cause operational instructions within one of the operational fields to be independent of operational instructions within the other operational fields, comprising:

m of instruction decoders;

n of instruction schedulers provided to correspond in number to said operation types for receiving operational instructions issued from the instruction decoders;

execution parts provided to correspond to said n instruction schedulers for executing operational instructions issued from the corresponding instruction schedulers; and register parts, wherein each of said instruction decoders includes an instruction buffer for storing therein the long instruction, judgement means for judging a register data dependent relationship and resource competition between the long instruction in execution and the long instruction within said instruction buffer, and means for dividing the long instruction within the instruction buffer into operational instructions and for controlling issuance of the divided operational instructions to said corresponding instruction scheduler even when execution of all the operational instructions within the long instruction in execution is not completed yet, wherein each of said instruction schedulers includes an instruction scheduler buffer for holding the operational instructions issued from said instruction decoder and means for selecting one of the operational instructions to be sent to the execution part among the operational instructions held in the instruction scheduler buffer and for controllably sending the selected operational instruction to the execution part together with the instruction stream number, and wherein each of said execution parts includes operational instruction execution means for executing the operational instructions received from said instruction scheduler, means for receiving and holding the instruction stream number received from the instruction scheduler, means for controlling operation of said operational instruction execution means on the basis of the received operational instruction and instruction stream number, and means for informing said instruction decoder and instruction scheduler of a state of said operational instruction execution means.

2. An information processing apparatus as set forth in claim 1, wherein the operational instruction execution means of said execution part, when detecting an exception generation through the execution of the operational instruction sends an exception generation signal to the instruction decoder corresponding to said instruction stream number, and said decoder includes means, when the operational instruction execution means of all said execution parts are in an acceptable state, for giving an instruction to the execution part which sends the exception generation signal to re-execute the operational instruction which caused the exception.

* * * * *